United States Patent
Bellinger et al.

(10) Patent No.: US 10,641,645 B2
(45) Date of Patent: May 5, 2020

(54) INTEGRAL FLUID MEASUREMENT SYSTEM

(71) Applicant: Simmonds Precision Products, Inc., Vergennes, VT (US)

(72) Inventors: Mark Bellinger, Cornwall, CT (US); Rollin W. Brown, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 281 days.

(21) Appl. No.: 15/718,926

(22) Filed: Sep. 28, 2017

(65) Prior Publication Data
US 2019/0094062 A1 Mar. 28, 2019

(51) Int. Cl.
| | | |
|---|---|---|
| *G01G 17/04* | (2006.01) | |
| *G01G 19/08* | (2006.01) | |
| *G01F 23/00* | (2006.01) | |
| *G01D 21/02* | (2006.01) | |
| *B64D 37/00* | (2006.01) | |
| *G01G 1/00* | (2006.01) | |

(52) U.S. Cl.
CPC ............ *G01G 17/04* (2013.01); *B64D 37/00* (2013.01); *G01D 21/02* (2013.01); *G01F 23/0076* (2013.01); *G01G 1/00* (2013.01); *G01G 19/08* (2013.01)

(58) Field of Classification Search
CPC ..... G01G 17/04; G01G 19/08; G01F 23/0076
See application file for complete search history.

(56) References Cited

U.S. PATENT DOCUMENTS

| | | | |
|---|---|---|---|
| 4,881,071 A | 11/1989 | Monterosso et al. | |
| 6,115,654 A | 9/2000 | Eid et al. | |
| 7,421,895 B1 | 9/2008 | Caldwell | |
| 8,473,176 B2 * | 6/2013 | Youngquist ............ | G01K 7/021 |
| | | | 123/169 R |
| 8,615,374 B1 | 12/2013 | Discenzo | |
| 9,020,767 B2 | 4/2015 | Georgeson et al. | |
| 9,035,800 B2 | 5/2015 | Bommer et al. | |
| 9,109,940 B2 | 8/2015 | Bahorich et al. | |
| 9,293,033 B2 | 3/2016 | Bommer et al. | |

(Continued)

OTHER PUBLICATIONS

"RS-232, RS-422, RS-485 Serial Communication General Concepts", National Instruments Corporation, http://www.ni.com/white-paper/11390/en/, published Jun. 29, 2016, 4 pages.

*Primary Examiner* — Mohamed Charioui
(74) *Attorney, Agent, or Firm* — Kinney & Lange, P.A.

(57) ABSTRACT

An integral fluid measurement system includes a first sensor configured to communicate using a first communication technology, a second sensor configured to communicate using a second communication technology, and a hybrid interface unit including a first interface configured to communicate with a first sensor using a first communication technology and a second interface configured to communicate with a second sensor using a second communication technology, where the first and second communication technologies are different from each other and may include electrical, fiber optic, radio frequency, optical pulse, and sonic pulse. The hybrid interface unit may also include a digital signal processor, data bus, and power supply, and may be capable of being disposed on a fluid tank wall.

16 Claims, 3 Drawing Sheets

(56) References Cited

U.S. PATENT DOCUMENTS

| | | | |
|---|---|---|---|
| 9,856,129 B2* | 1/2018 | King | H04L 9/3215 |
| 2009/0208219 A1 | 8/2009 | Rhodes et al. | |
| 2014/0125496 A1* | 5/2014 | D'Alessandro | G01F 23/0069 |
| | | | 340/870.11 |
| 2014/0373622 A1 | 12/2014 | Kline et al. | |
| 2015/0022373 A1* | 1/2015 | Bommer | H04Q 9/00 |
| | | | 340/870.11 |
| 2018/0052029 A1* | 2/2018 | Carralero | G01F 23/14 |

* cited by examiner

INTEGRAL FLUID MEASUREMENT SYSTEM

BACKGROUND

The present disclosure relates generally to remote sensors, and more particularly, to a system that communicatively connects to fuel sensors using various means of receiving data from the sensors.

Aviation fuel sensors are employed for measuring various parameters of fuel in tanks including height, dielectric, conductivity, temperature, and pressure to provide an accurate indication of the weight and location of fuel as well as other possible parameters. The suite of fuel sensors provides an indication of fuel weight in each fuel tank to an onboard instrumentation and control system. An aircraft may have a number of fuel tanks disposed throughout, thereby requiring the monitoring of fuel parameters in several different tanks. An accurate knowledge of onboard fuel weight has a variety of uses including take-off and landing weight calculations, estimating flying range, and adjusting an aircraft's weight balance.

SUMMARY

According to one embodiment of the present disclosure, an integral fluid measurement system provides a means of communicating between a hybrid interface unit and the suite of sensors located within a fluid tank, whereby the sensors transmit data to the hybrid interface unit using at least two communication technologies which may include electrical, fiber optic, radio frequency (RF), optical pulse, and sonic pulse.

According to another embodiment of the present disclosure, an integral fluid measurement system has a scalable sensor communication architecture that can configure to accommodate additional sensors using any means of sensor data transmission, while transmitting the collected data to a centralized instrumentation system utilizing a standard serial data interface.

According to another embodiment of the present disclosure, a scalable sensor communication structure enables an aircraft fuel system designer to employ a suite of sensors that utilize different communications means throughout a fuel tank while minimizing the weight and cost of sensor components and installation and maintenance time, as compared to sensor architecture of the prior art.

According to another embodiment of the present disclosure, a scalable sensor communication structure enables the installation of additional sensors or replacement sensors to fuel tanks in an aircraft during maintenance.

DETAILED DESCRIPTION

Figure 1A:
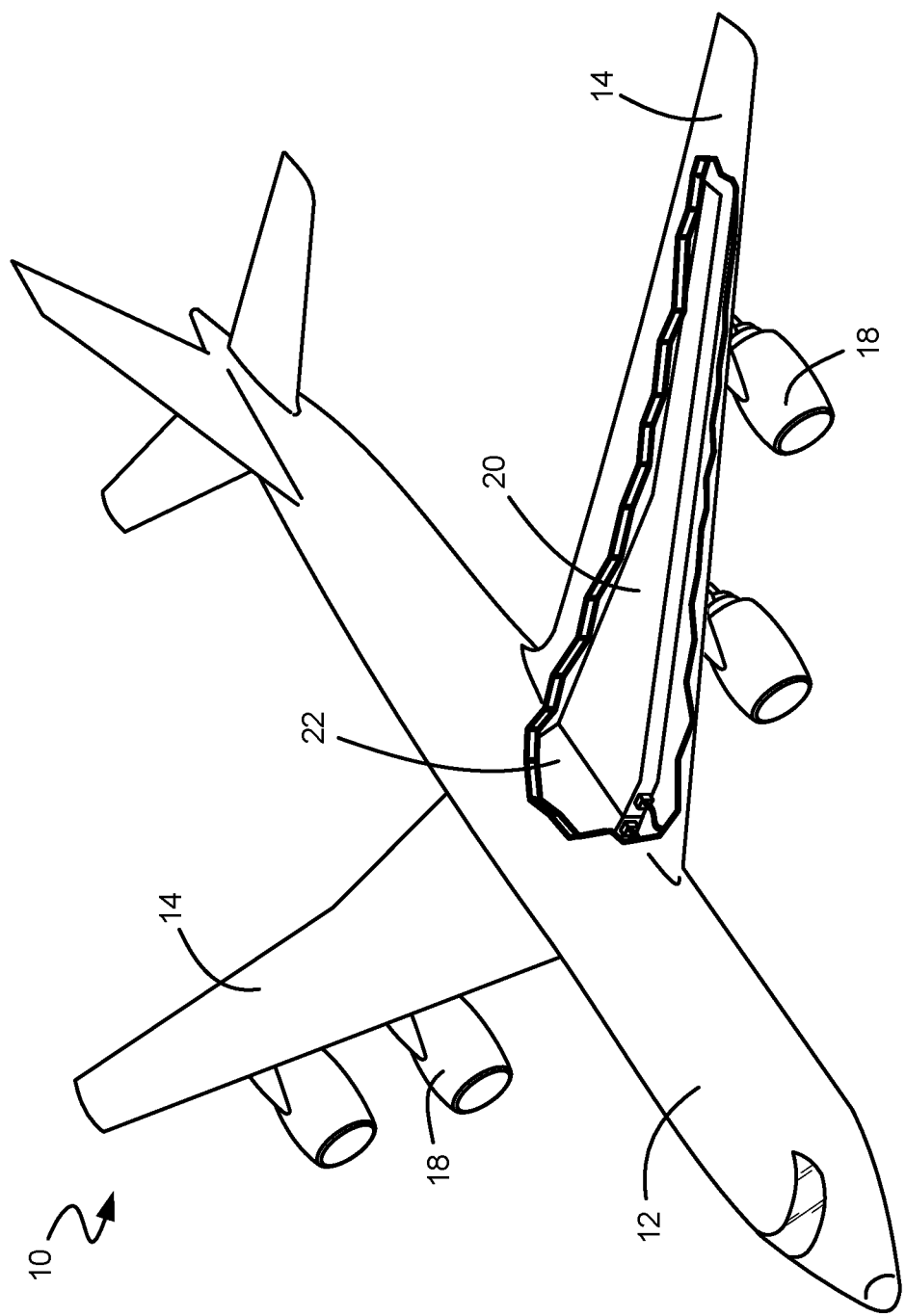
FIG. 1A is a perspective view of an aircraft with a partial cut-away showing a wing fuel tank and a portion of a center fuel tank.

FIG. 1A is a perspective view illustrating a portion of the fuel storage tanks onboard an aircraft. Shown in FIG. 1A is aircraft 10, fuselage 12, wings 14, engines 18, wing fuel tank 20, and center fuel tank 22.

Aircraft 10 is an example of an aircraft in which an integral fluid measurement system may be employed. In the illustrated embodiment, aircraft 10 has fuselage 12, two wings 14, and four engines 18. Fuselage 12 encloses the payload area of aircraft 10, typically consisting of passengers and cargo. Operating personnel, instrumentation, and control systems are also contained within fuselage 12. Wings 14 provide aerodynamic lift for airplane 10, while also holding engines 18. Engines 18 consume fuel to create thrust for airplane 10. Wing fuel tank 20 and center fuel tank 22 hold fuel, which is consumed by engines 18. Wing fuel tank 20 and center fuel tank 22 are exemplary of a plurality of fuel tanks that may be located in aircraft 10. Those who are skilled in the art of aircraft construction are familiar with the locations of various fuel tanks that may be located therein. Prior to flying, various fuel tanks within aircraft 10 may be filled with fuel which is consumed by engines 18 during flight. Prior to and during flight, crew members and/or systems aboard aircraft 10 may obtain knowledge of the inventory of fuel that exists in each of the various fuel tanks to calculate the mass and/or weight, and mass and/or weight distribution, of fuel stored throughout aircraft 10. As used in this disclosure, mass and weight may be used interchangeably in describing a fuel parameter.

In some embodiments, aircraft 10 may be refueled during flight. Crew members and/or aboard aircraft 10 may obtain knowledge of the inventory of fuel in each of the various fuel tanks during the refueling operation and after the completion of the refueling operation.

Figure 1B:
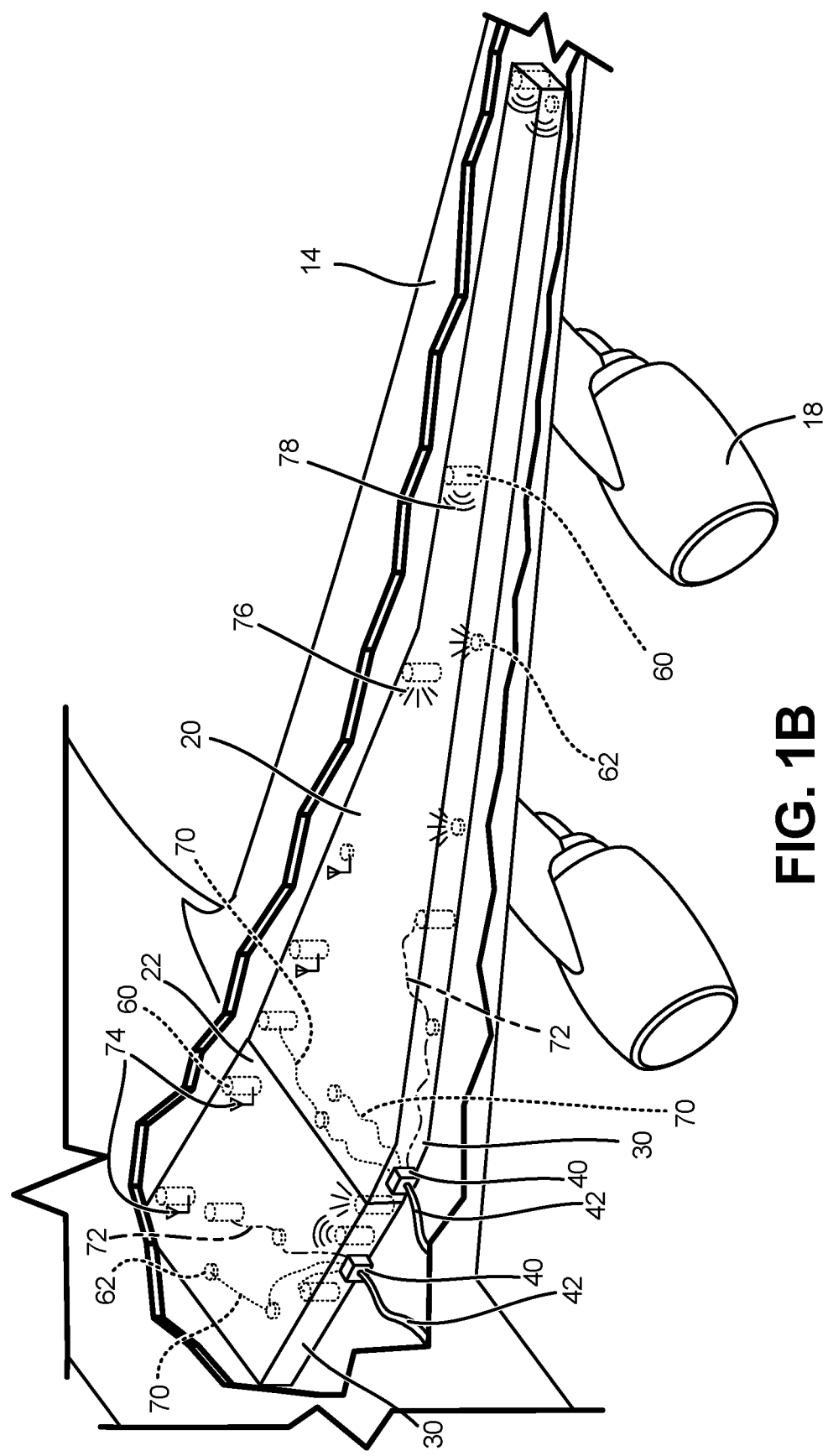
FIG. 1B is a perspective view of the aircraft wing fuel tank and a center fuel tank in FIG. 1A showing several fuel sensors, communications means, and tank wall hybrid interface units.

FIG. 1B is a perspective view of the exemplary fuel tanks shown in FIG. 1A. Shown in FIG. 1B is wing fuel tank 20 and center fuel tank 22, tank wall 30, hybrid interface units 40, electrical cable 42, column sensors 60 and/or point sensors 62, electrical link 70, fiber optic link 72, RF link 74, optical pulse link 76, and sonic pulse link 78.

In the illustrated embodiment, wing fuel tank 20 and center fuel tank 22 are exemplary of a plurality of fuel tanks which may be located in aircraft 10. Wing fuel tank 20 and center fuel tank 22 each have tank wall 30. Located within aircraft 10 is a plurality of various fuel tanks, each having a shape and size that is designed to accommodate the space within which a fuel tank is located. For example, wing fuel tank 20 has a generally long and tapered geometric shape that accommodates the interior of wing 14. Each fuel tank may have a particular geometric configuration, being comprised of a plurality of tank walls 30. For illustrative purposes, a single tank wall 30 is identified on each of wing fuel tank 20 and center fuel tank 22. Hybrid interface units 40 are disposed on each of wing fuel tank 20 and center fuel tank 22, affixed upon a respective tank wall 30. Each hybrid interface unit 40 is electrically connected to an instrumentation and control system (not shown) by electrical cable 42.

In the illustrated embodiment, a plurality of column sensors 60 and point sensors 62 are disposed throughout wing fuel tank 20 and center fuel tank 22. Column sensors 60 are disposed in various areas throughout wing fuel tank 20 and center fuel tank 22, generally spanning the vertical height of wing fuel tank 20 and center fuel tank 22 to provide a range of fuel level sensing from full to empty. Alternatively, column sensors 60 may span only a portion of the vertical height of wing fuel tank 20 and center fuel tank 22. Column sensors 60 may employ one of several possible sensing technologies to detect one or more parameters associated with fuel. For example, column sensors 60 may employ capacitive sensing to detect fuel level or to sense fuel dielectric. Point sensors 62 are disposed at various points throughout wing fuel tank 20 and center fuel tank 22, to detect a parameter associated with fuel at a particular point. Point sensor 62 may employ one of several possible sensing technologies to detect one or more parameters associated with fuel. For example, point sensors 62 may employ resistive sensing to detect fuel temperature, or inductive sensing to detect fuel density. For further example, point sensor 62 may detect point level, identify whether or not a respective point sensor 62 is covered by fuel.

In the illustrated embodiment, column sensors 60 and/or point sensors 62 may be self-powered, drawing electrical power used for sensing a fuel parameter and transmitting data from an internal power supply (not shown). Alternatively, column sensors 60 and/or point sensors 62 may be powered from an external source, with the source of power being delivered through its data link or from another external source (not shown). Those who are skilled in the art of fuel sensors are familiar with various sensor designs that may be employed for detecting various parameters associated with fuel. Moreover, the skilled artesian will appreciate the reasons for multiple column sensors 60 and/or point sensors 62 being disposed throughout wing fuel tank 20 and center fuel tank 22, including the need to accurately measure fuel mass during various attitudes of aircraft 10 such as pitching, banking, and/or inverted flight.

In the illustrated embodiment, multiple communications technologies may be utilized for the transmission of data from column sensors 60 and/or point sensors 62 to hybrid interface unit 40. As used herein, a communication technology may also be referred to as a means of communication. In other embodiments, two or more communication technologies may be deployed on column sensor 60 and/or point sensor 62. In some embodiments, column sensor 60 and/or point sensor 62 may select between two or more communication technologies that are available.

In the illustrated embodiment, electrical link 70 communicates data from column sensors 60 and/or point sensors 62 to hybrid interface unit 40 by the transmission of electrical signals through electrical link 70. Electrical link 70 may be a single wire or a multiple-conductor cable. Electrical link 70 may directly connect column sensors 60 and/or point sensors 62 to hybrid interface unit 40. Electrical link 70 may also indirectly connect column sensors 60 and/or point sensors 62 to hybrid interface unit 40 via a different column sensors 60 and/or point sensors 62 using a daisy-chain configuration. Both the direct and indirect connections are depicted in FIG. 1B.

In the illustrated embodiment, fiber optic link 72 communicates data from column sensors 60 and/or point sensors 62 to hybrid interface unit 40 by the transmission of optical signals through fiber optic link 72. Fiber optic link 72 may be a single optical fiber or a bundle of optical fibers. Fiber optic link 72 may directly connect column sensors 60 and/or point sensors 62 to hybrid interface unit 40. Fiber optic link 72 may also indirectly connect column sensors 60 and/or point sensors 62 to hybrid interface unit 40 via different column sensors 60 and/or point sensors 62 using a daisy-chain configuration. Both the direct and indirect connections are depicted in FIG. 1B.

In the illustrated embodiment, RF link 74 communicates data from column sensors 60 and/or point sensors 62 to hybrid interface unit 40 by the transmission of RF electromagnetic signals that propagate through the interior of wing fuel tank 20 and center fuel tank 22. RF link 74 may transmit RF electromagnetic signals using any polarization topology including, without limitation, planar, circular, and planar cross-polarized transmission. When wing fuel tank 20 and/or center fuel tank 22 are filled with fuel, RF signal propagation is though fuel, and RF link 74 may utilize an electromagnetic frequency band that is selected for propagation through fuel. When wing fuel tank 20 and/or center fuel tank 22 is empty of fuel, being replaced with a gas, RF signal propagation is though gas and RF link 74 may utilize an electromagnetic frequency band that is selected for propagation through gas. In an embodiment, the gas may be air or fuel vapor. In some embodiments, an inert gas may be used to replace fuel as it is consumed.

In the illustrated embodiment, optical pulse link 76 communicates data from column sensors 60 and/or point sensors 62 to hybrid interface unit 40 by the transmission of optical pulses that propagate through the interior of wing fuel tank 20 and/or center fuel tank 22. Optical pulses may have a wavelength in the infrared light range. In some embodiments, optical pulses may have a wavelength in the visible or ultraviolet light range. When wing fuel tank 20 and/or center fuel tank 22 is filled with fuel, optical pulse propagation is though fuel and optical pulse link 76 may utilize an optical wavelength that is selected for propagation through fuel. When wing fuel tank 20 and/or center fuel tank 22 is empty of fuel, being replaced with a gas, optical pulse propagation is though gas and optical pulse link 76 may utilize an optical wavelength that is selected for propagation through gas. In an embodiment, the gas may be air or fuel vapor. In some embodiments, an inert gas may be used to replace fuel as it is consumed.

In the illustrated embodiment, sonic pulse link 78 communicates data from column sensors 60 and/or point sensors 62 to hybrid interface unit 40 by the transmission of sonic pulses that propagate through the interior of wing fuel tank 20 and/or center fuel tank 22. Sonic pulses may also be referred to as acoustical pulses. Acoustical pulses may have a frequency in the audible frequency range. In some embodiments, acoustical pulses may have a frequency in the ultrasonic frequency range. When wing fuel tank 20 and center fuel tank 22 is filled with fuel, acoustical pulse propagation is though fuel and sonic pulse link 78 may utilize an acoustical frequency that is selected for propagation through fuel. When wing fuel tank 20 and/or center fuel tank 22 is empty of fuel, being replaced with a gas, acoustical pulse propagation is though gas and sonic pulse link 78 may utilize an acoustical frequency that is selected for propagation through gas. In an embodiment, the gas may be air or fuel vapor. In some embodiments, an inert gas may be used to replace fuel as it is consumed.

Figure 2:
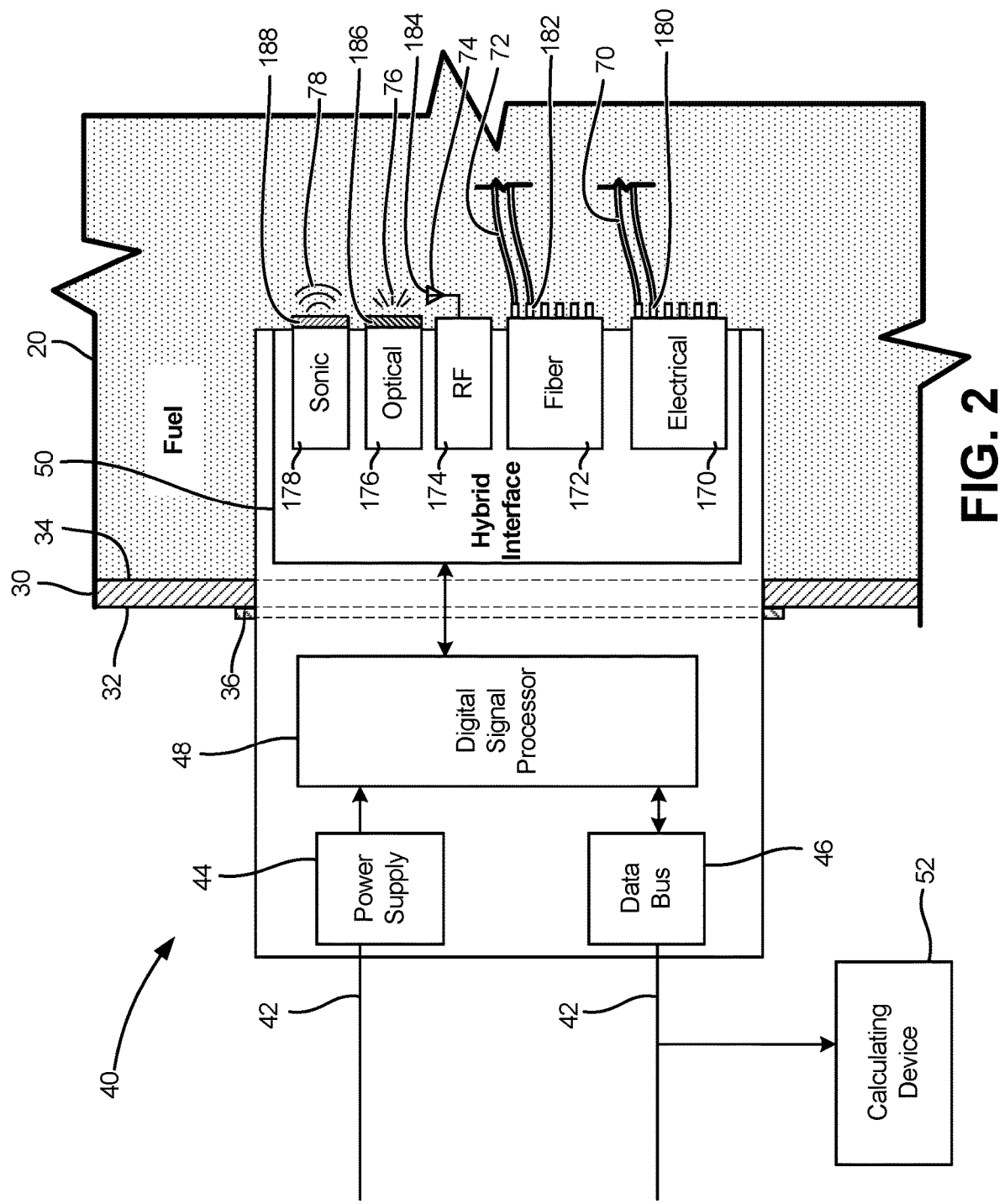
FIG. 2 is a schematic block diagram of the tank wall hybrid interface unit.

FIG. 2 is schematic block diagram of the hybrid interface unit. Shown in FIG. 2 is tank wall 30, fuel tank exterior 32, fuel tank interior 34, tank wall mounting apparatus 36, hybrid interface unit 40, electrical cables 42, power supply 44, data bus 46, digital signal processor 48, hybrid interface 50, calculating device 52, electrical module 170, electrical connections 180, electrical link 70, fiber optic module 172, fiber optic connections 182, fiber optic link 72, RF module 174, RF antenna 184, RF link 74, optical pulse module 176, optical transducer 186, optical pulse link 76, sonic pulse module 178, acoustical transducer 188, and sonic pulse link 78.

In the illustrated embodiment, tank wall 30 has fuel tank exterior 32 on the outside, accessible within fuselage 12 or within wing 14 of aircraft 10 as shown in FIG. 1A. Tank wall 30 has fuel tank interior 34 on the inside, which may contain fuel, fuel vapor, air, or an inert gas as described in FIG. 1B. Hybrid interface unit 40 is disposed on tank wall 30, being affixed to tank wall 30 by tank wall mounting apparatus 36. Those who are skilled in the art of fuel tanks are familiar with methods and apparatus used to attach various components to fuel tanks, allowing penetration of tank wall 30 while excluding the leakage of fuel.

Hybrid interface unit 40 is depicted as a block diagram in FIG. 2, being comprised of several functional components. Power supply 44 receives electrical power from an electrical bus (not shown) on aircraft 10 via electrical cable 42. Power supply 44 provides electrical power to digital signal processor 48, to hybrid interface 50, and to all other circuit components of hybrid interface unit 40. Data bus 46 receives data from, and transmits data to, calculating device 52 on aircraft 10 via electrical cable 42. Electrical cable 42 may be two separate cables as depicted in FIG. 2. In some embodiments, electrical cable 42 may also be a single cable as depicted in FIG. 1A, containing several electrical conductors. In some embodiments, electrical cable 42 may transmit power and data over the same conductor.

In the illustrated embodiment, data bus 46 is a serial data communications bus. For example, data bus 46 may comply with any of a number of industry data bus standards including, without limitation, RS-482, RS-485, RS-422, RS-423, RS-232, Controller Area Network (CAN), and Ethernet. In some embodiments, a new data bus standard may be developed for data bus 46, whether the new standard is proprietary, experimental, or it becomes a new industry standard. In some embodiments, a parallel data bus standard may be used with data bus 46 instead of a serial data bus.

In the illustrated embodiment, hybrid interface 50 is comprised of multiple data communications modules, with each of the data communications modules representing a different means of data communication. Electrical module 170 communicates with various column sensors 60 and/or point sensors 62 by means of electrical link 70. Electrical module 170 contains a plurality of electrical connections 180 within fuel tank interior 34. Electrical link 70 may directly connect column sensors 60 and/or point sensors 62 to electrical module 170 via electrical connection 180. Electrical link 70 may also indirectly connect column sensors 60 and/or point sensors 62 to electrical module 170 via a different column sensors 60 and/or point sensors 62 using a daisy-chain configuration as described in FIG. 1B. Each of the plurality of electrical connections 180 on electrical module 170 may be connected to an electrical cable that comprises electrical link 70. If any of the plurality of electrical connections 180 is not used, any individual electrical connection may be terminated. In some embodiments, electrical connection 180 may be self-terminating when not connected. Those who are skilled in the art of fuel sensors are familiar with methods of terminating or attaching electrical cables to electrical connections 180 within a fuel tank.

Fiber optic module 172 communicates with various column sensors 60 and/or point sensors 62 by means of fiber optic link 72. Fiber optic module 172 contains a plurality of fiber optic connections 182 within fuel tank interior 34. Fiber optic link 72 may directly connect column sensors 60 and/or point sensors 62 to fiber optic module 172 via fiber optic link connection 182. Fiber optic link 72 may also indirectly connect column sensors 60 and/or point sensors 62 to fiber optic module 172 via a different column sensors 60 and/or point sensors 62 using a daisy-chain configuration as described in FIG. 1B. Each of the plurality of fiber optic connections 182 on fiber optic module 172 may be connected to a fiber cable that comprises fiber optic link 72. If any of the plurality of fiber optic connections 182 is not used, any individual fiber optic connection may be terminated. In some embodiments, fiber optic connection 182 may be self-terminating when not connected. Those who are skilled in the art of fuel sensors are familiar with methods of terminating or attaching fiber optic cables to fiber optic connections 182 within a fuel tank.

RF module 174 communicates with various column sensors 60 and/or point sensors 62 by means of RF link 74. RF module 174 contains RF antenna 184 within fuel tank interior 34. RF module 174 communicates with column sensors 60 and/or point sensors 62 by transmitting and receiving RF electromagnetic signals from RF antenna 184 via RF link 74. Different electromagnetic frequencies may be used to propagate through fuel and through the gas that replaces fuel as fuel is consumed, as described in FIG. 1B. In some embodiments, different RF modulation modes may be used in RF link 74. Examples of modulation modes include, without limitation, amplitude frequency modulation, frequency modulation, phase modulation, and pulse code modulation.

Optical pulse module 176 communicates with various column sensors 60 and/or point sensors 62 by means of optical pulse link 76. Optical pulse module 176 contains optical transducer 186 within fuel tank interior 34. Optical pulse module 176 communicates with column sensors 60 and/or point sensors 62 by transmitting and receiving optical pulse signals from optical transducer 186 via optical pulse link 76. Different optical wavelengths may be used to propagate through fuel and through the gas that replaces the fuel, as described in FIG. 1B. In some embodiments, different optical modulation modes may be used in optical pulse link 76.

Sonic pulse module 178 communicates with various column sensors 60 and/or point sensors 62 by means of sonic pulse link 78. Sonic pulse module 178 contains acoustical transducer 188 within fuel tank interior 34. Sonic pulse module 178 communicates with column sensors 60 and/or point sensors 62 by transmitting and receiving acoustical signals from acoustic transducer 188 via sonic pulse link 78. Different acoustical frequencies may be used to propagate through fuel and through the gas that replaces the fuel, as described in FIG. 1B. In some embodiments, different sonic modulation modes may be used in sonic pulse link 78.

In some embodiments, hybrid interface 50 may be comprised of fewer than five data communications modules. For example, hybrid interface unit may be comprised of only electrical module 170 and fiber optic module 172. In this embodiment, only electrical link 70 and fiber optic link 72 will be used. In some embodiments, hybrid interface 50 may be comprised of a means of sensor data communication different from the means of communication described here. Any embodiment in which at least two means of sensor data communication are used is within the scope of the present disclosure.

In some embodiments, hybrid interface unit 40 may be programmed to address sensors that are within a tank that is supported by hybrid interface unit 40. In some embodiments, hybrid interface unit 40 may assign or re-assign addresses to sensors that are disposed within a fuel tank that is supported by hybrid interface unit 40. In some embodiments, hybrid interface 40 may auto-detect sensors and assign a new address to each detected sensor. In some embodiments, hybrid interface unit 40 may perform an accumulation node function for column sensors 60 and/or point sensors 62 that are daisy chained as distributed nodes. Hybrid interface unit 40 detects, determines the number of, and assigns a unique address to each column sensors 60 and/or point sensors 62 along the daisy chain. In some embodiments, hybrid interface unit may also generate and assign parameters regarding communication protocol, including, without limitation, update rate, data resolution, and scaling parameters.

In the illustrated embodiment, hybrid interface unit 40 has a scalable system architecture (not shown), meaning that when additional sensors are introduced, hybrid interface unit can modify the sensor addressing methodology to accommodate the additional sensors.

In some embodiments, hybrid interface unit 40 is capable of synchronizing with a plurality of hybrid interface units, meaning that multiple hybrid interface units may be employed on a particular fuel tank, each hybrid interface unit being capable of addressing and receiving data from a network of sensors within a particular tank.

In some embodiments, additional styles of sensors may be addressed by hybrid interface unit 40 other than column sensors 60 and/or point sensors 62 described above. In some embodiments, additional styles of sensors may select between two or more communication technologies that are available. In some embodiments, the communication technology and the mode of modulation used by a particular communication technology may be scaled to match the particular technology being used by column sensors 60 and/or point sensors 62.

In some embodiments, additional communications means may be added to hybrid interface unit 40 beyond electrical link 70, fiber optic link 72, RF link 74, optical pulse link 76, and sonic pulse link 78 as described above.

DISCUSSION OF POSSIBLE EMBODIMENTS

The following are non-exclusive descriptions of possible embodiments of the present invention.

A hybrid interface unit according to an exemplary embodiment of this disclosure, among other possible things, includes a hybrid interface, the hybrid interface configured to communicate with a first sensor disposed in the fluid tank using a first communication technology, and with a second sensor disposed in the fluid tank using a second communication technology different from the first communication technology; a data bus interface; and a digital signal processor, the digital signal processor configured to exchange data between the hybrid interface and the data bus interface.

The hybrid interface unit of the preceding paragraph can optionally include, additionally and/or alternatively, any one or more of the following features, configurations and/or additional components:

A further embodiment of the foregoing hybrid interface unit, wherein the hybrid interface is configured to communicate to a third sensor using a third communication technology.

A further embodiment of the foregoing hybrid interface unit, wherein the hybrid interface is configured to communicate to a third sensor using a fourth communication technology.

A further embodiment of the foregoing hybrid interface unit, wherein the hybrid interface is configured to communicate to a third sensor using a fifth communication technology.

A further embodiment of the foregoing hybrid interface unit, wherein the first communication technology is selected from the group consisting of electrical, fiber optic, radio frequency, optical pulse, and sonic pulse; and the second communication technology is selected from the group consisting of electrical, fiber optic, radio frequency, optical pulse, and sonic pulse.

A further embodiment of the foregoing hybrid interface unit, wherein the hybrid interface unit is scalable to accommodate additional sensors.

A further embodiment of the foregoing hybrid interface unit, wherein the hybrid interface unit is capable of assigning addresses to additional sensors.

An integral fluid measurement system comprised of: a hybrid interface unit for communicating with one or more sensors disposed in a fluid tank, the hybrid interface unit comprising: a hybrid interface, the hybrid interface configured to communicate with a first sensor disposed in the fluid tank using a first communication technology, and with a second sensor disposed in the fluid tank using a second communication technology different from the first communication technology; a data bus interface; and a digital signal processor, the digital signal processor configured to exchange data between the hybrid interface and the data bus interface; a fluid tank configured to contain a fluid; and a calculating device configured to receive data from the data bus interface; wherein the data represents at least one parameter that is associated with the fluid; and the calculating device is configured to calculate at least one parameter that is associated with the fluid.

The integral fluid measurement system of the preceding paragraph can optionally include, additionally and/or alternatively, any one or more of the following features, configurations and/or additional components:

A further embodiment of the foregoing integral fluid measurement system, wherein the at least one parameter is the weight of the fuel.

A method of assembling an integral fluid measurement system comprising the steps of: disposing a hybrid interface unit on a fluid tank, the hybrid interface unit being comprised of: a hybrid interface, the hybrid interface configured to communicate with a first sensor disposed in the fluid tank using a first communication technology, and with a second sensor disposed in the fluid tank using a second communication technology different from the first communication technology; a data bus interface; and a digital signal processor, the digital signal processor configured to exchange data between the hybrid interface and the data bus interface; affixing a plurality of sensors within the fluid tank; communicatively connecting the hybrid interface unit to the plurality of sensors; and coupling the hybrid interface unit to a calculating device.

The method of the preceding paragraph can optionally include, additionally and/or alternatively, any one or more of the following features, configurations and/or additional components:

A further embodiment of the foregoing method, wherein the first communication technology is selected from the group consisting of electrical, fiber optic, radio frequency, optical pulse, and sonic pulse; and the second communication technology is selected from the group consisting of electrical, fiber optic, radio frequency, optical pulse, and sonic pulse.

A further embodiment of the foregoing method, wherein the coupling uses a serial data bus architecture.

A further embodiment of the foregoing method, wherein the serial data bus architecture is selected from the group consisting of: RS-482, RS-485, RS-422, RS-423, RS-232, Controller Area Network, and Ethernet.

A further embodiment of the foregoing method, wherein the coupling uses a parallel data bus architecture.

A further embodiment of the foregoing method, wherein the hybrid interface unit is scalable to accommodate additional sensors.

A further embodiment of the foregoing method, wherein the hybrid interface unit is capable of assigning an address to additional sensors.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hybrid interface unit for communicating with one or more sensors disposed in a fluid tank, the hybrid interface unit comprising:
a hybrid interface, the hybrid interface configured to communicate with a first sensor disposed in the fluid tank using a first communication technology, and with a second sensor disposed in the fluid tank using a second communication technology different from the first communication technology;
a data bus interface; and
a digital signal processor, the digital signal processor configured to exchange data between the hybrid interface and the data bus interface.

2. The hybrid interface unit of claim 1, wherein the hybrid interface is configured to communicate to a third sensor using a third communication technology.

3. The hybrid interface unit of claim 2, wherein the hybrid interface is configured to communicate to a fourth sensor using a fourth communication technology.

4. The hybrid interface unit of claim 3, wherein the hybrid interface is configured to communicate to a fifth sensor using a fifth communication technology.

5. The hybrid interface unit of claim 1, wherein:
the first communication technology is selected from the group consisting of electrical, fiber optic, radio frequency, optical pulse, and sonic pulse; and
the second communication technology is selected from the group consisting of electrical, fiber optic, radio frequency, optical pulse, and sonic pulse.

6. The hybrid interface unit of claim 1, wherein the hybrid interface is scalable to accommodate additional sensors.

7. The hybrid interface unit of claim 6, wherein the hybrid interface is capable of assigning addresses to additional sensors.

8. An integral fluid measurement system comprising:
a hybrid interface unit for communicating with one or more sensors disposed in a fluid tank, the hybrid interface unit comprising:
a hybrid interface, the hybrid interface configured to communicate with a first sensor disposed in the fluid tank using a first communication technology, and with a second sensor disposed in the fluid tank using a second communication technology different from the first communication technology;
a data bus interface; and
a digital signal processor, the digital signal processor configured to exchange data between the hybrid interface and the data bus interface;
a fluid tank configured to contain a fluid; and
a calculating device configured to receive data from the data bus interface;
wherein the data represents at least one parameter that is associated with the fluid; and
the calculating device is configured to calculate at least one parameter that is associated with the fluid.

9. The integral fluid measurement system of claim 8, wherein the at least one parameter is a weight of the fuel.

10. A method of assembling an integral fluid measurement system comprising the steps of:
disposing a hybrid interface unit on a fluid tank, the hybrid interface unit being comprised of:
a hybrid interface, the hybrid interface configured to communicate with a first sensor disposed in the fluid tank using a first communication technology, and with a second sensor disposed in the fluid tank using a second communication technology different from the first communication technology;
a data bus interface; and
a digital signal processor, the digital signal processor configured to exchange data between the hybrid interface and the data bus interface;
affixing a plurality of sensors within the fluid tank;
communicatively connecting the hybrid interface unit to the plurality of sensors; and
coupling the hybrid interface unit to a calculating device.

11. The method of claim 10, wherein:
the first communication technology is selected from the group consisting of electrical, fiber optic, radio frequency, optical pulse, and sonic pulse; and
the second communication technology is selected from the group consisting of electrical, fiber optic, radio frequency, optical pulse, and sonic pulse.

12. The method of claim 10, wherein the coupling uses a serial data bus architecture.

13. The method of claim 12, wherein the serial data bus architecture is selected from the group consisting of: RS-482, RS-485, RS-422, RS-423, RS-232, Controller Area Network, and Ethernet.

14. The method of claim 10, where the coupling uses a parallel data bus architecture.

15. The method of claim 10, wherein the hybrid interface unit is scalable to accommodate additional sensors.

16. The method of claim 10, wherein the hybrid interface unit is capable of assigning an address to additional sensors.

* * * * *